Nov. 19, 1935.  R. R. OSBORN  2,021,324
FOLDING WING AIRPLANE
Filed June 29, 1934   3 Sheets-Sheet 1

INVENTOR.
ROBERT R. OSBORN.
BY
ATTORNEYS.

Nov. 19, 1935.　　　R. R. OSBORN　　　2,021,324
FOLDING WING AIRPLANE
Filed June 29, 1934　　　3 Sheets-Sheet 2

INVENTOR.
ROBERT R. OSBORN.
BY
ATTORNEYS.

Nov. 19, 1935. R. R. OSBORN 2,021,324
FOLDING WING AIRPLANE
Filed June 29, 1934 3 Sheets-Sheet 3
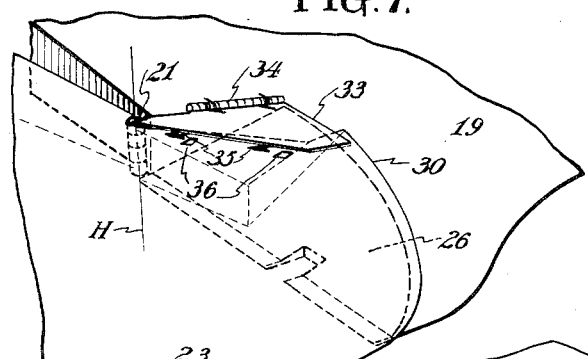
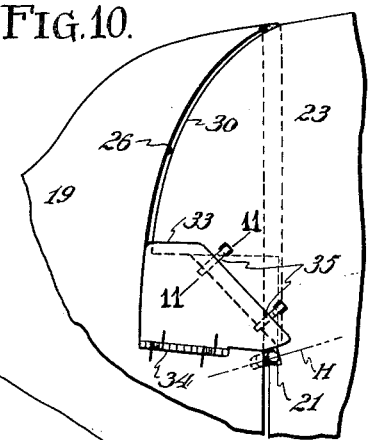
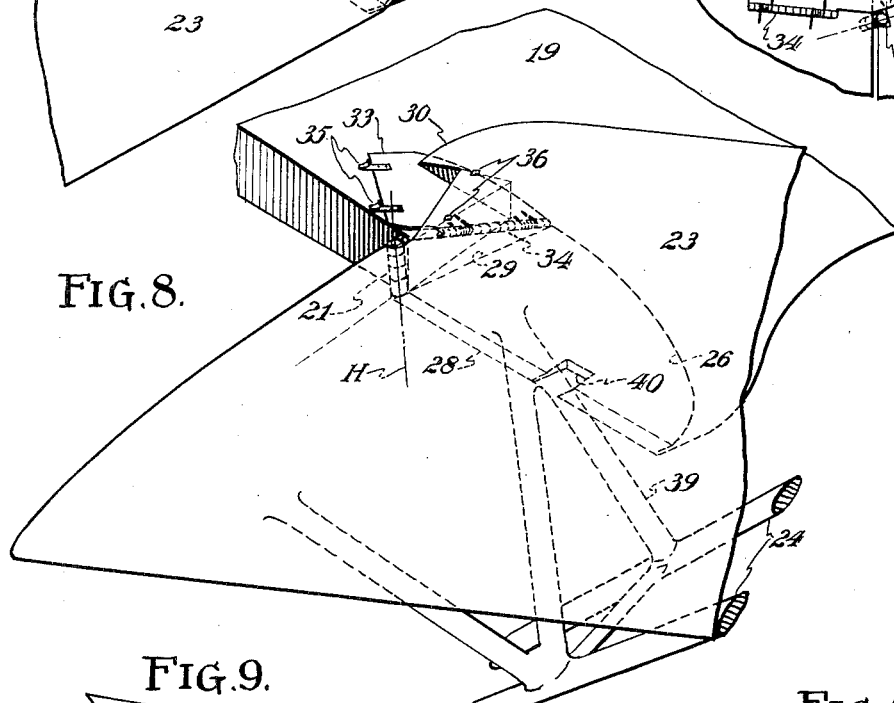
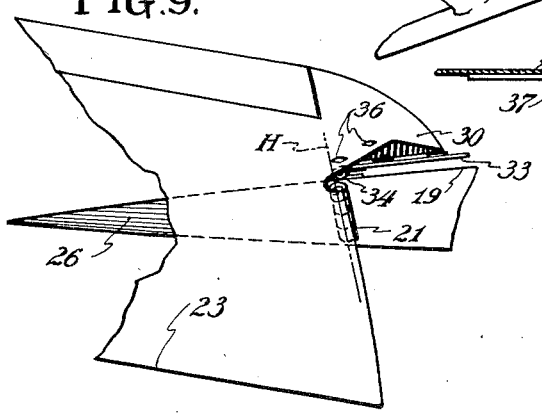
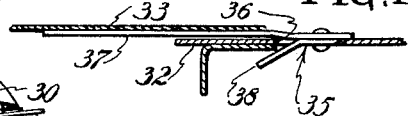
INVENTOR.
ROBERT R. OSBORN.
BY
ATTORNEYS.

Patented Nov. 19, 1935

2,021,324

UNITED STATES PATENT OFFICE 2,021,324

FOLDING WING AIRPLANE

Robert R. Osborn, Kenmore, N. Y., assignor to Curtiss Aeroplane & Motor Company, Inc., a corporation of New York Application June 29, 1934, Serial No. 733,007

8 Claims. (Cl. 244—12)

This invention relates to aircraft, and is more particularly concerned with the provision of a novel form of folding wing organization for airplanes.

In previous forms of folding wing arrangements, in order to stow the wings rearwardly against or above the fuselage, either or both of the following disadvantages accrue: The wings are provided with hinged flaps or other appurtenances which must be folded prior to folding of the wings, necessitating the services of more than one operator, or consuming more time than should be necessary. The wings are hinged to swing about an axis such that they tend to swing to the folded position, whereby, should the operator release the wing after unlocking it from its extended position, it may slam open and damage parts. Also, the folded position is usually such that the wing is substantially parallel to the fuselage thereby drooping from the forward part of the fuselage toward the ground whereby the wing end interferes with the close nesting of a number of aircraft, as, for instance, on the deck of an aircraft carrier.

Objects of this invention are: To provide a folding wing arrangement for aircraft; to provide a wing which may be folded from an active flight position to a folded position wherein the wing is elevated and substantially parallel to the ground to permit stowing of adjacent aircraft without undue interference; to provide a wing hinge on a slanting axis, the slant being so organized that the wing will tend to swing to a rest position intermediate the flight and folded attitudes; to provide a wing that folds up and over part of the supporting structure; to provide a recessed center fixed wing section within the recess of which part of the wing may move when folded; to provide an automatically acting cover for such a recess; and to provide a wing strut structure hinged on an axis coincident with the wing hinge, the struts being movable with the associated wing.

Other objects will become apparent in reading the annexed specification and claims, and in viewing the drawings, in which similar numbers indicate similar parts, and in which:

Figs. 6, 7 and 8 are perspective views of fragments of the left wing and center section in different positions of adjustment;

Fig. 9 is a side elevation on the line 9—9 of Fig. 1;

Fig. 10 is a plan of a fragment of the left wing and center section; and

Fig. 11 is a section on the line 11—11 of Fig. 10.

Figure 1:
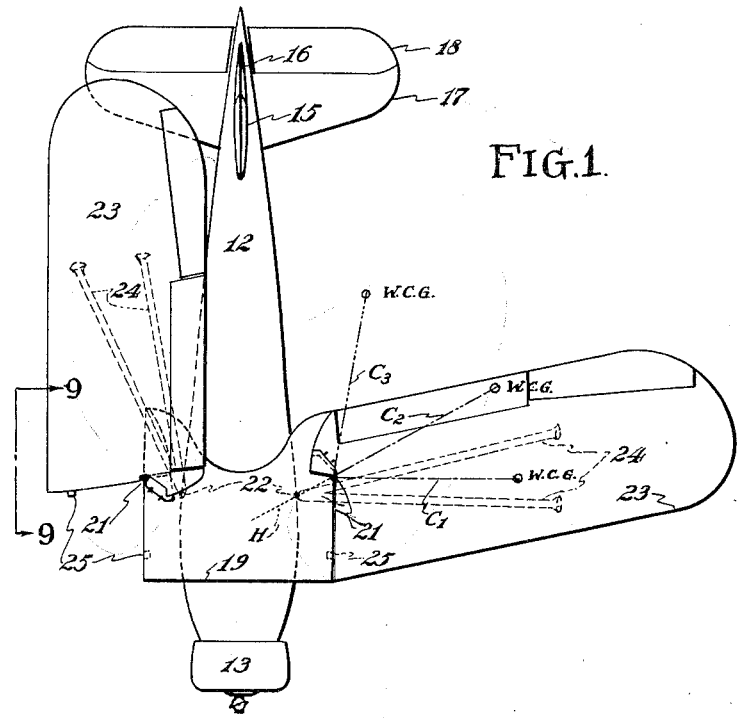
Figs. 1, 2 and 3 are respectively a plan, a front elevation and a left side elevation of an aircraft embodying the invention, and showing the right wing folded and the left wing extended.
Figure 2:
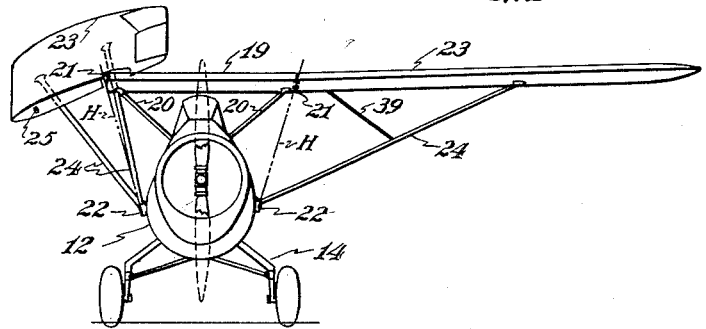
Figure 3:
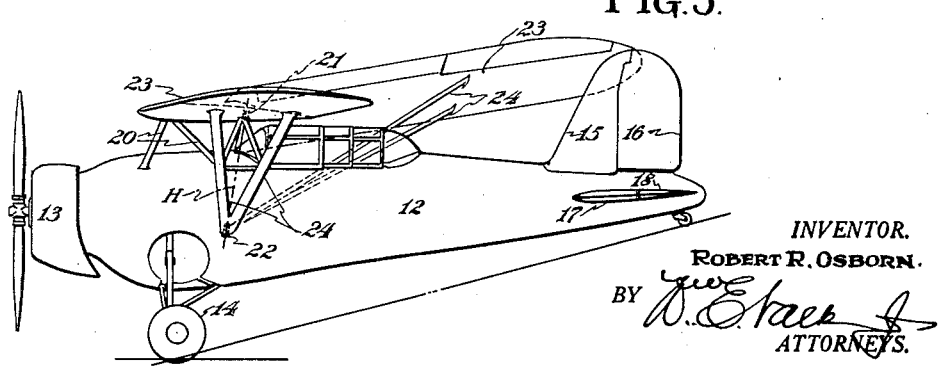
Figure 4:
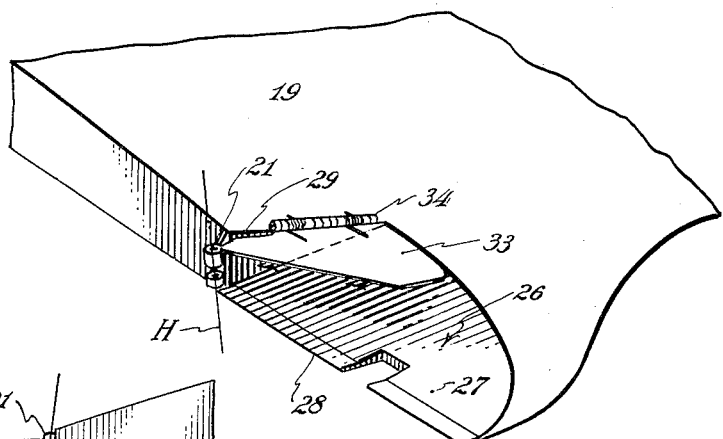
Fig. 4 is a perspective view of a fragment of the fixed center section, left side.
Figure 5:
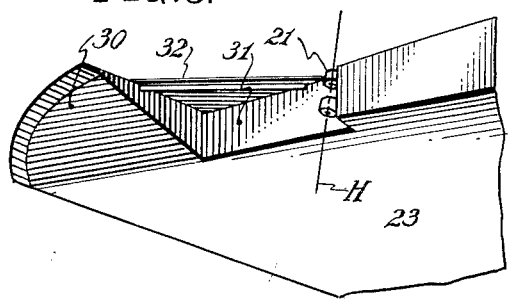
Fig. 5 is a perspective view of a fragment of the root of the left wing.

Referring to Figs. 1, 2 and 3, an airplane is shown which comprises a fuselage 12 having a cowled power plant 13 at its forward end and having a retractable landing gear 14. The conventional empennage comprising a vertical fin 15, rudder 16, horizontal stabilizer 17 and elevators 18 are mounted at the rearward end of the fuselage. Above the forward portion of the fuselage, a fixed center wing section 19 is carried by struts 20, the center section having wing hinge points 21 at its lateral faces, forwardly spaced from the trailing edge thereof. The fuselage 12 is also provided with hinge points 22, the axes of the hinges 21 and 22 being coincident and being designated by the letter H. It may be noted that the axis H slants upwardly, rearwardly and outwardly from the fuselage. A wing 23 is carried by each hinge 21, said hinge, as in the case of the center section, being forwardly located from the trailing edge of the wing and being located at the root thereof. Lift struts 24 extend from the lower surface of the wing 23 inwardly and downwardly to the hinge 22. Thereby, the wing 23 with the struts 24, may swing as a unit about the hinge axis H between a flight position and a folded position, wherein the wing extends rearwardly along the side of the fuselage, as shown in the left side of Fig. 1.

Referring to Fig. 1, the letters W. C. G. denote the wing center of gravity, and a line C designates a line passing through the hinge 21 and said wing center of gravity. The letter $C_1$ shows this line C when the wing is in readiness for flight, while the line $C_3$ represents the position of the line and concurrently of the wing when the latter is folded. Due to the slant of the hinge axis as above specified, when the wing is free to swing between the folded and extended positions, it will come to rest in a position such as indicated by the line $C_2$, where the center of gravity of the wing is in a vertical plane passing through the hinge axis H. This, of course, results from the tendency for the wing to assume the lowest possible position which, by the organization of the hinge axis H, will lie approximately half way between the folded and extended wing positions. By this organization, the tendency for the wing to swing violently to either its folded or extended position, with possible damage to parts with which it comes in contact, is wholly avoided. If the wing is released from its flight position, it will swing downwardly and rearwardly to the line C₂, after which it is necessary for an attendant to push the wing rearwardly and inwardly to the folded position. Conversely, if the wing is released from the folded position, it will swing forwardly to the line C₂, after which it is necessary for an operator to push the wing forwardly to the flight position.

Locking means 25 are provided between the forward edge of the wing and the forward edge of the center section, whereby the wing may be locked in flight position after it has been moved thereto. Such locking means are well known in the art, and may comprise, for instance, a tenon carried by the wing engageable within a mortise in the center section, which may be locked together by a pin insertable through both.

Referring to Figs. 2 and 3, it will be seen that when the wing 23 is moved to a folded position, it will lie substantially parallel to the ground when the aircraft is at rest on the ground. Thus, ample clearance is provided throughout the span of the wing to permit other aircraft to be nested close to the subject aircraft without interference of the tail surfaces of one craft with the folded wings of another. This feature is resultant from the slanted hinge axis H, and is particularly desirable in aircraft carrier operation. Therein it is necessary to stow a maximum number of aircraft on the deck of the carrier.

Figure 6:
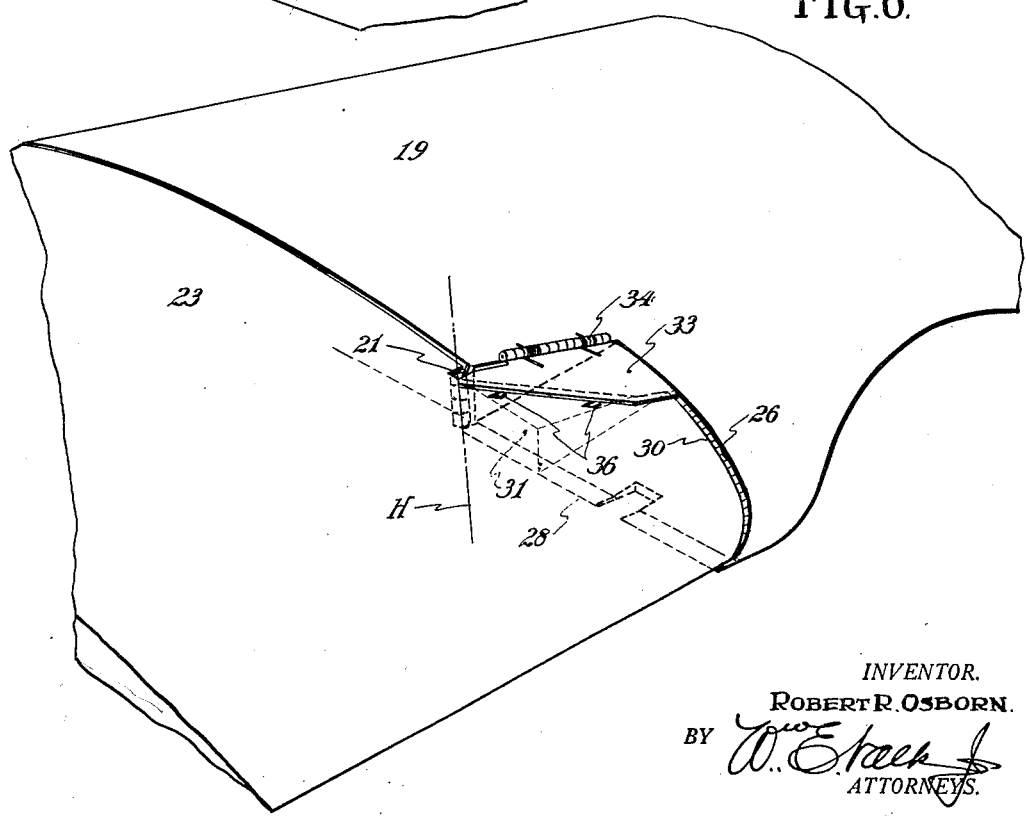

It was stated that the hinge axis H passes through the center section 19 and the wing 23 at a point forwardly of the trailing edges of both. The hinge axis is so located, due to the fact that the main spars of wing and center section pass along those elements forwardly of the trailing edge and provide the best possible location for attachment. Also, by hinging the wing at a point forwardly of its trailing edge, its lateral extension when folded, will be substantially less. To provide means for collapsing the trailing edge portion of the center section, the construction shown in Figs. 4 to 11 has been developed. The lateral edge of the center section rearward of the hinge 21 is recessed as at 26, the lower surface of the center section being maintained intact to its lateral edge, but the upper surface being cut away to provide a relatively slanted portion 27. This slant is developed by rotating the lower lateral center section edge 28 about the hinge axis H to a substantially vertical wall 29 forming the forward boundary of the recess and extending transversely to the line of flight. The trailing edge portion of the wing 23 is provided at its root with a projection 30 extending inwardly from the parting line of the wing and center section to lie within the recess 26. The lower surface of this projection 30 is complementary to the slanted surface 27, while the upper surface of the projection 30 is continuous with the upper surface of the wing. Forward of the projection 30, a substantially rectangular cutout 31 in the wing is made, this being partially covered by a diagonal gusset 32 coplanar with the top wing surface. Fig. 6 shows the wing and center section in flight position, wherein the projection 30 enters into and fills the rear part of the recess 26. Fig. 7 shows the wing in an initial stage of folding from the flight position, wherein the projection 30 has started to slide up and over the center section 19, this being permissible due to the slant of the hinge axis H. Fig. 8 shows the wing 23 fully folded with respect to the center section 19, the projection 30 in this instance, having passed upwardly and over the center section 19 so that the portion of the cutout 31 parallel to the wing chord abuts against the wall 29.

It will be apparent that the gusset 32 partly covers the recess 26 when the wing is fully extended to its flight position. However, a portion of the recess 26 would remain uncovered, interrupting the continuity of the upper wing surface were it not for a flap 33 spring-hinged at 34 to the intersection of the wall 29 with the upper surface of the center section 19. This flap is cut to a shape to cover the otherwise uncovered portion of the recess 26, and by virtue of the spring hinge, will always be urged toward the plane of the top wing surface. When the folding of the wing is started, the wing itself will push the flap upwardly, causing it to swing forwardly on its hinge, so that when the wing is fully folded, the flap has been urged back against the top of the center section.

Means are provided to positively lock the flap in place when the wing is extended to flight position, such means comprising a pair of hooks 35—35 attached to one edge of the flap. Coacting openings 36—36 are formed in the gusset 32 whereby the hooks 35 will engage within said openings just prior to final seating of the wing in flight position. When such seating is accomplished, the flap is firmly held in a position coincident with the upper wing surface. Initial folding of the wing releases the hooks whereby the flap may swing forwardly as previously described.

Fig. 11 shows the detail construction of the hook 35, which comprises a flap strip 37 fixed to the flap 33 and extending beyond the edge thereof. The hook portion 38 is riveted to the strip 37, being bent downwardly and inwardly therefrom to engage the opening 36 and to resiliently hold the flap in fixed position.

In the construction shown, the lift struts 24 are provided with auxiliary struts 39 which slant upwardly and inwardly toward the wing root. A small cutout 40 is provided in the edge 28 of the center section to accommodate one of the struts 39 when the wing is fully folded.

By the above described construction, redundant folding flaps with consequent increases in weight and complexity are wholly avoided, and it is readily possible for a single attendant or operator to effect folding or extension of the wings unaided. Likewise, those devices of the prior art which consist of flexible gussets or inserts are avoided, such flexible elements being subject to deterioration and undue wear in service. This construction provides that all elements be rigid and strong, as well as light in weight. The construction shown in Figs. 4 to 11 is made possible by virtue of the slanting hinge axis H previously described, said slanting hinge axis also enabling the advantages described in the first part of the specification to be obtained.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a folding wing aircraft, a fixed wing section, a wing hinged to said section at a point forwardly of the trailing edges of both, said section having a recess within which the trailing portion of said wing passes upon folding of said wing, and a flap carried by said section for covering said recess upon extension of said wing.

2. In a folding wing aircraft, a fixed wing section, a wing hinged to said section at a point forwardly of the trailing edges of both, said section having a recess within which the trailing portion of said wing passes upon folding of said wing, and a flap carried by said section for covering said recess upon extension of said wing, said flap being spring-hinged to said section whereby said wing bears upon and moves said flap to uncover said recess upon folding movement of said wing.

3. In a folding wing aircraft, a fixed wing section, a wing hinged to said section at a point forwardly of the trailing edges of both, said section having a recess within which the trailing portion of said wing passes upon folding of said wing, a flap carried by said section for covering said recess upon extension of said wing, said flap being spring-hinged to said section whereby said wing bears upon and moves said flap to uncover said recess upon folding movement of said wing, and locking means automatically engageable between said flap and said wing upon extension of said wing for holding said flap in a recess covering position.

4. In a folding wing aircraft, a pair of coacting wing elements hinged for relative swinging at a point forward of the trailing edges of both, one said element having a recess rearward of said hinge and the other said element having a trailing edge portion lying in said recess when said wings are extended, said portion being movable in said recess upon wing folding, and a flap carried by one said element adapted to cover the unfilled part of said recess when said wings are extended, said flap being movable with respect to said elements upon folding of said wings.

5. In a folding wing aircraft, a pair of coacting wing elements hinged for relative swinging at a point forward of the trailing edges of both, one said element having a recess rearward of said hinge and the other said element having a trailing edge portion lying in said recess when said wings are extended, said portion being movable in said recess upon wing folding, and a flap carried by one said element adapted to cover the unfilled part of said recess when said wings are extended, said flap being hinged to said element.

6. In a folding wing aircraft, a pair of coacting wing elements hinged for relative swinging at a point forward of the trailing edges of both, one said element having a recess rearward of said hinge and the other said element having a trailing edge portion lying in said recess when said wings are extended, said portion being movable in said recess upon wing folding, and a flap carried by one said element adapted to cover the unfilled part of said recess when said wings are extended, said flap having resilient means urging it toward a recess covering position.

7. In a folding wing aircraft, a pair of coacting wing elements hinged for relative swinging at a point forward of the trailing edges of both, one said element having a recess rearward of said hinge and the other said element having a trailing edge portion lying in said recess when said wings are extended, said portion being movable in said recess upon wing folding, a flap carried by one said element adapted to cover the unfilled part of said recess when said wings are extended, said flap having resilient means urging it toward a recess covering position, and locking means for holding said flap in recess closing position upon extension of said wing elements.

8. In a folding wing aircraft, a wing element and a supporting element, said wing element being hingedly connected forward of its trailing edge to said supporting element, one said element having a recess and the other said element having a projection rearward of said hinge adapted to lie within part of said recess when said wing is extended, and a movable flap carried by one said element adapted to cover the uncovered portion of said recess when said wing is extended.

ROBERT R. OSBORN.